United States Patent [19]
Beaudoin et al.

[11] Patent Number: 5,816,191
[45] Date of Patent: Oct. 6, 1998

[54] STALL MANAGER SYSTEM, MODULE AND FEEDING DEVICE FOR MANAGEMENT OF MEALTIMES AND FOOD DISTRIBUTION IN ANIMAL STALLS

[76] Inventors: Gaétan Beaudoin, 18 Pacaud, Victoriaville, Quebec, Canada, G6P 5M7; Yves Drouin, 105 Lafrance, apt. 17, Victoriaville, Quebec, Canada, G6P 4V5; Jocelyn Martineau, 400 rang 10, Lyster, Quebec, Canada, G0S 1V0; André Milette, 34 Curé Suzor, apt. 1, Victoriaville, Quebec, Canada, G6P 6M8

[21] Appl. No.: 648,608

[22] Filed: May 15, 1996

[30] Foreign Application Priority Data

May 24, 1995 [CA] Canada ................................. 2150068

[51] Int. Cl.⁶ ..................................................... A01K 5/02
[52] U.S. Cl. .................................. 119/57.92; 119/51.02; 119/57.2
[58] Field of Search ............................ 119/51.01, 51.02, 119/57.1, 57.2, 57.92

[56] References Cited

U.S. PATENT DOCUMENTS

| | | | |
|---|---|---|---|
| 4,498,424 | 2/1985 | Leuschner | 119/57.2 |
| 4,712,511 | 12/1987 | Zamzow et al. | 119/51.02 |
| 4,854,328 | 8/1989 | Pollack | 119/51.02 |
| 5,028,918 | 7/1991 | Giles et al. | 119/51.02 |
| 5,559,716 | 9/1996 | Gaalswyk | 0119/51.02 |
| 5,636,118 | 6/1997 | Brewster et al. | 119/51.02 |

*Primary Examiner*—Edgar S. Burr
*Assistant Examiner*—Steven S. Kelley
*Attorney, Agent, or Firm*—Lowe, Price, LeBlanc & Becker

[57] ABSTRACT

The stall manager system controls food distribution and mealtimes in a given number of animal stalls arranged in stall lines. The system comprises a given number of electronically controllable feeding devices mounted in the animal stalls, which are controlled by a stall manager module for each one of the animal stalls. A central computer unit manages food distribution and mealtimes relative to the feeding devices in the animal stalls. The central computer unit has communication resources for addressing selective command messages to the stall manager modules to accomplish the management. The stall manager modules are connected in series, and are each provided with a repeater circuit for relaying data between the central computer unit and the next stall manager module in line. The stall manager modules have a data processing unit for processing the command messages addressed to its attention by the central computer unit, and resources for producing and transmitting control signals to the feeding devices depending on the received command messages.

18 Claims, 15 Drawing Sheets

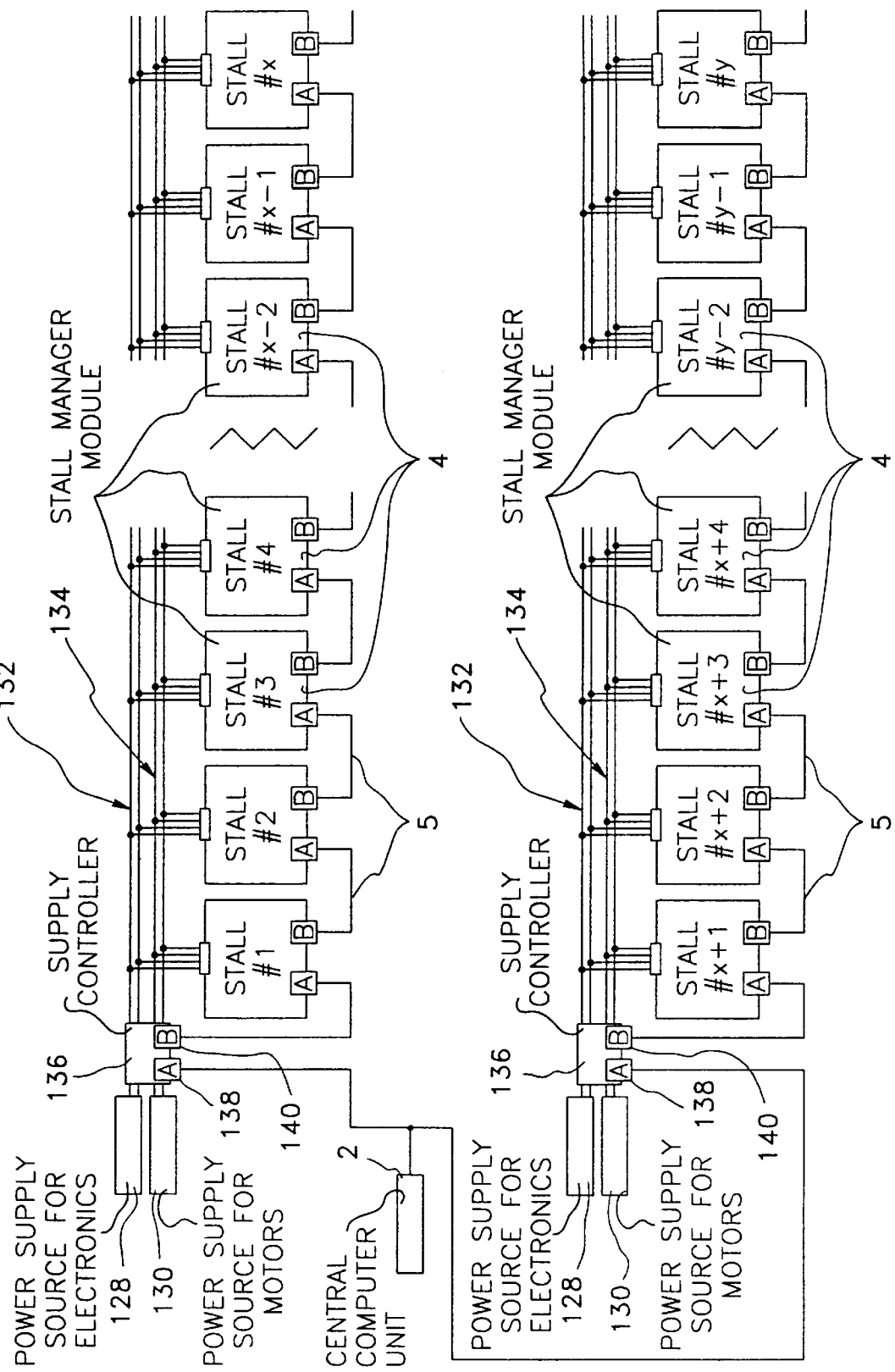

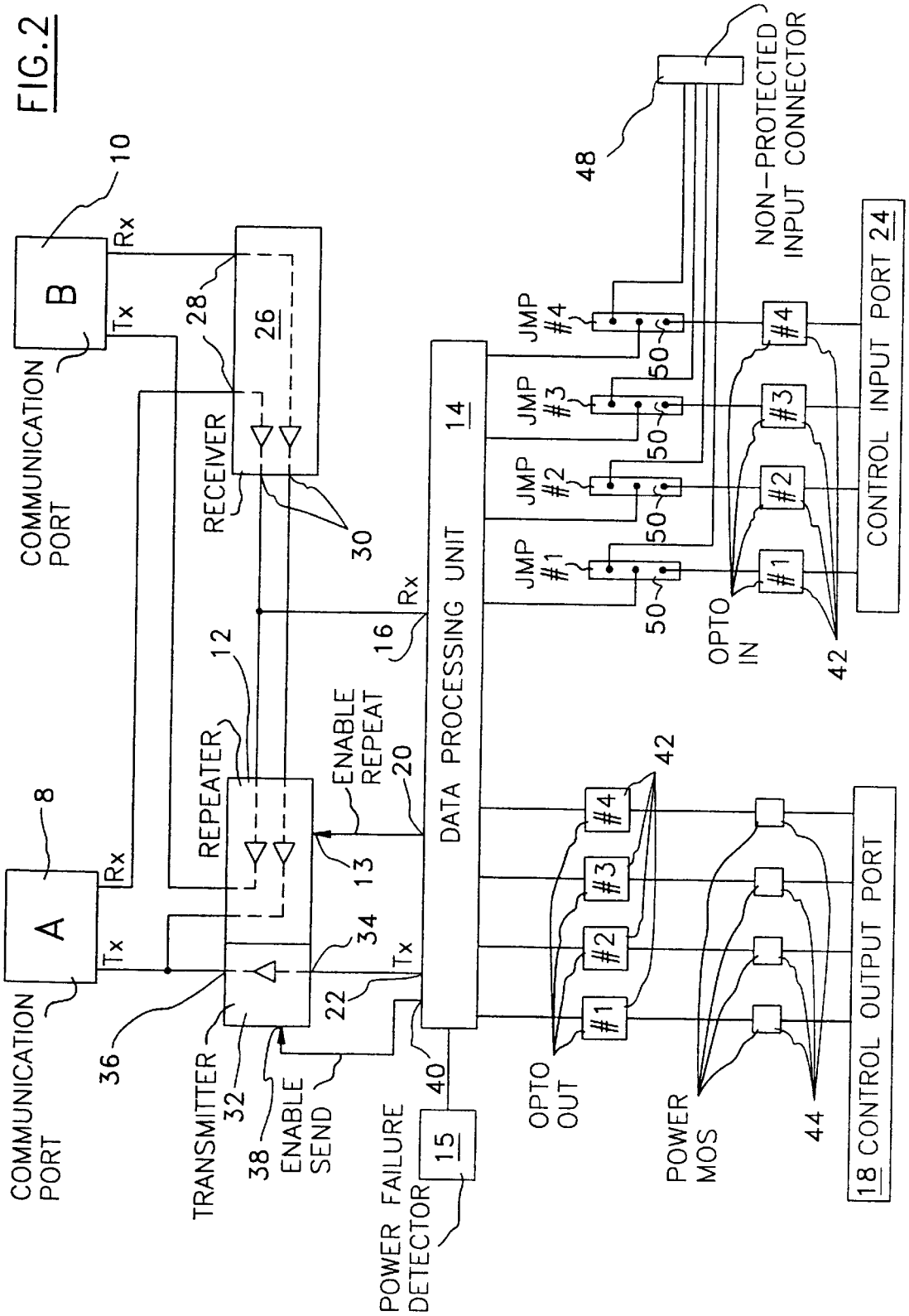

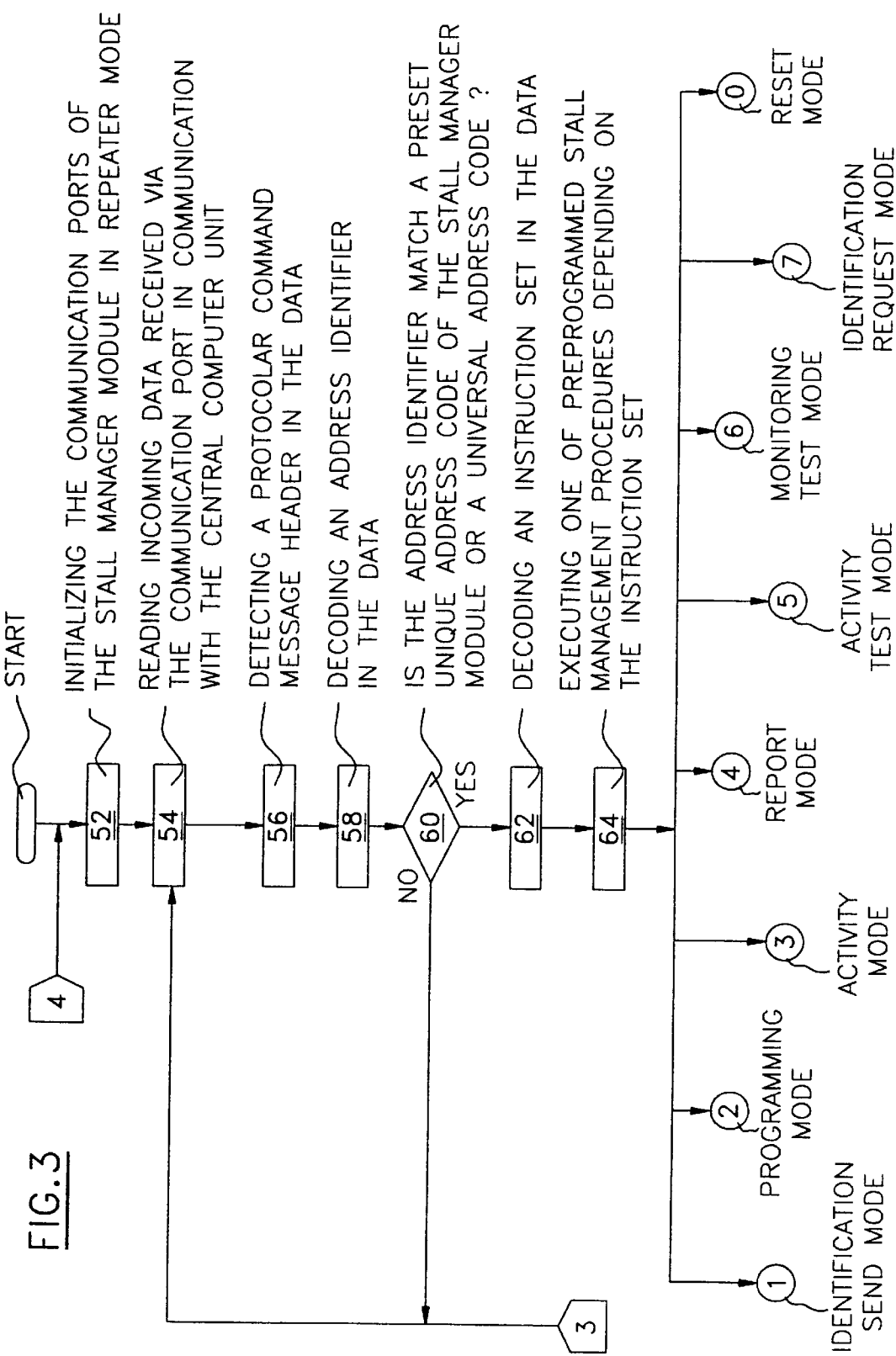

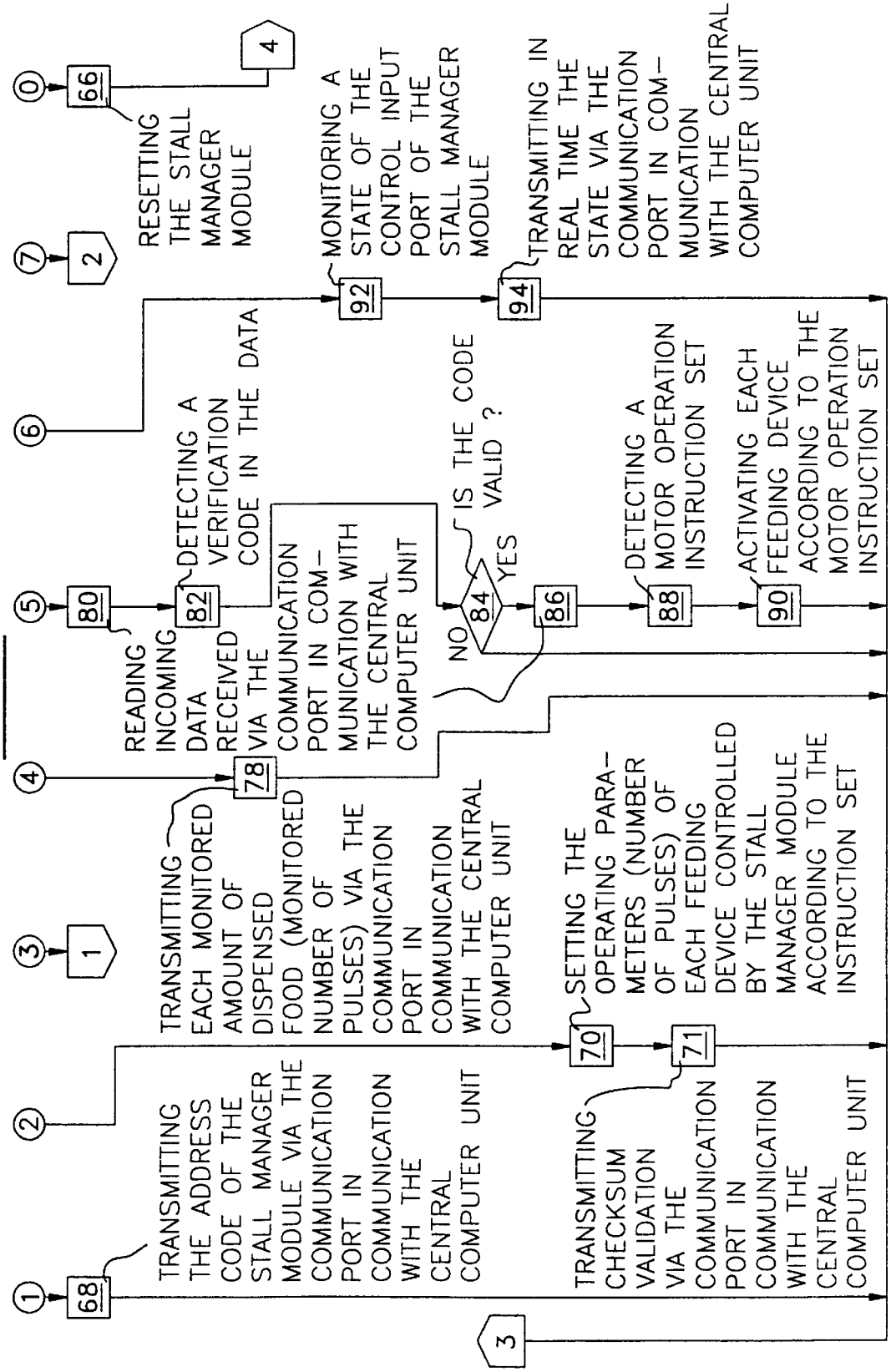

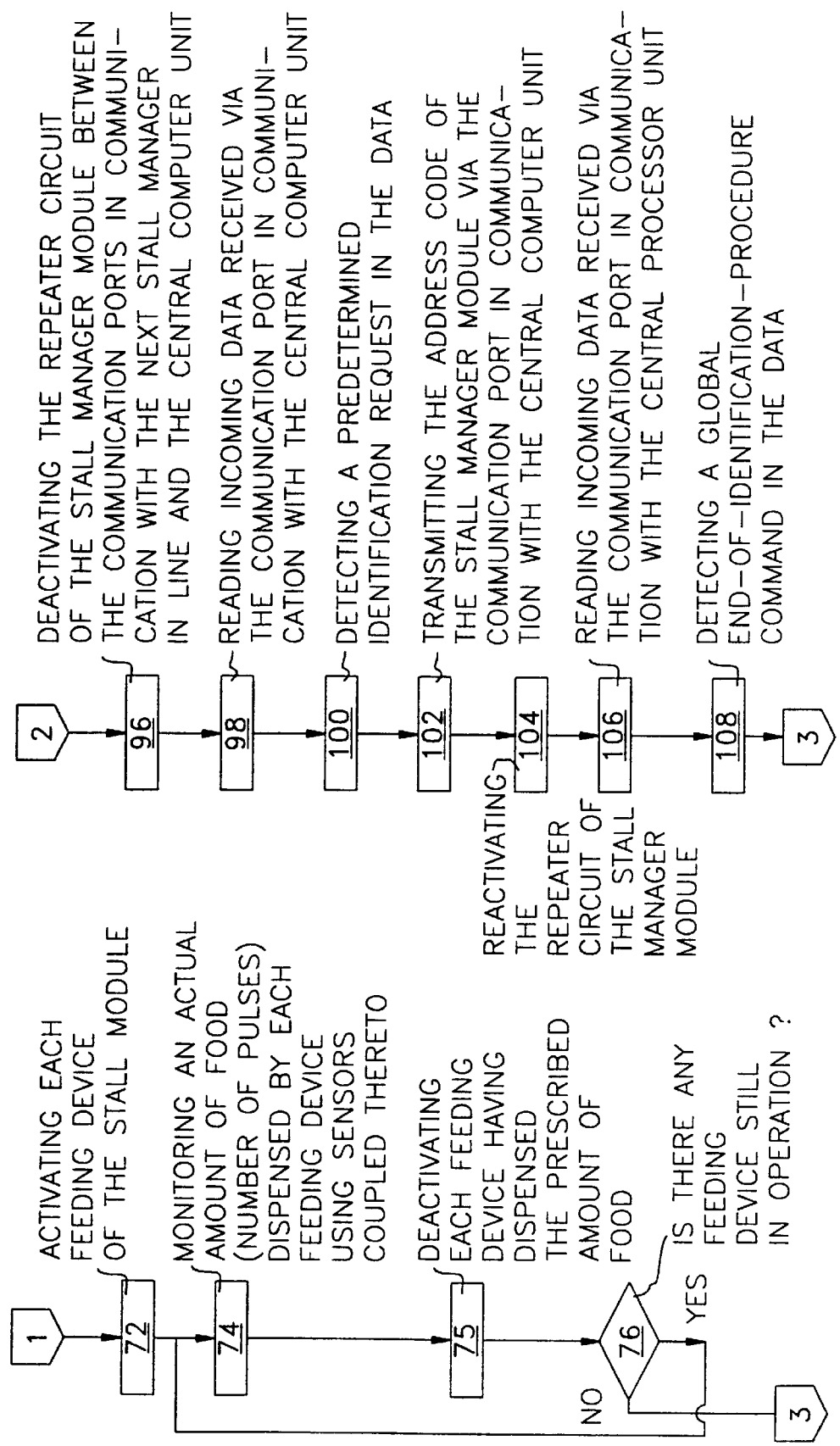

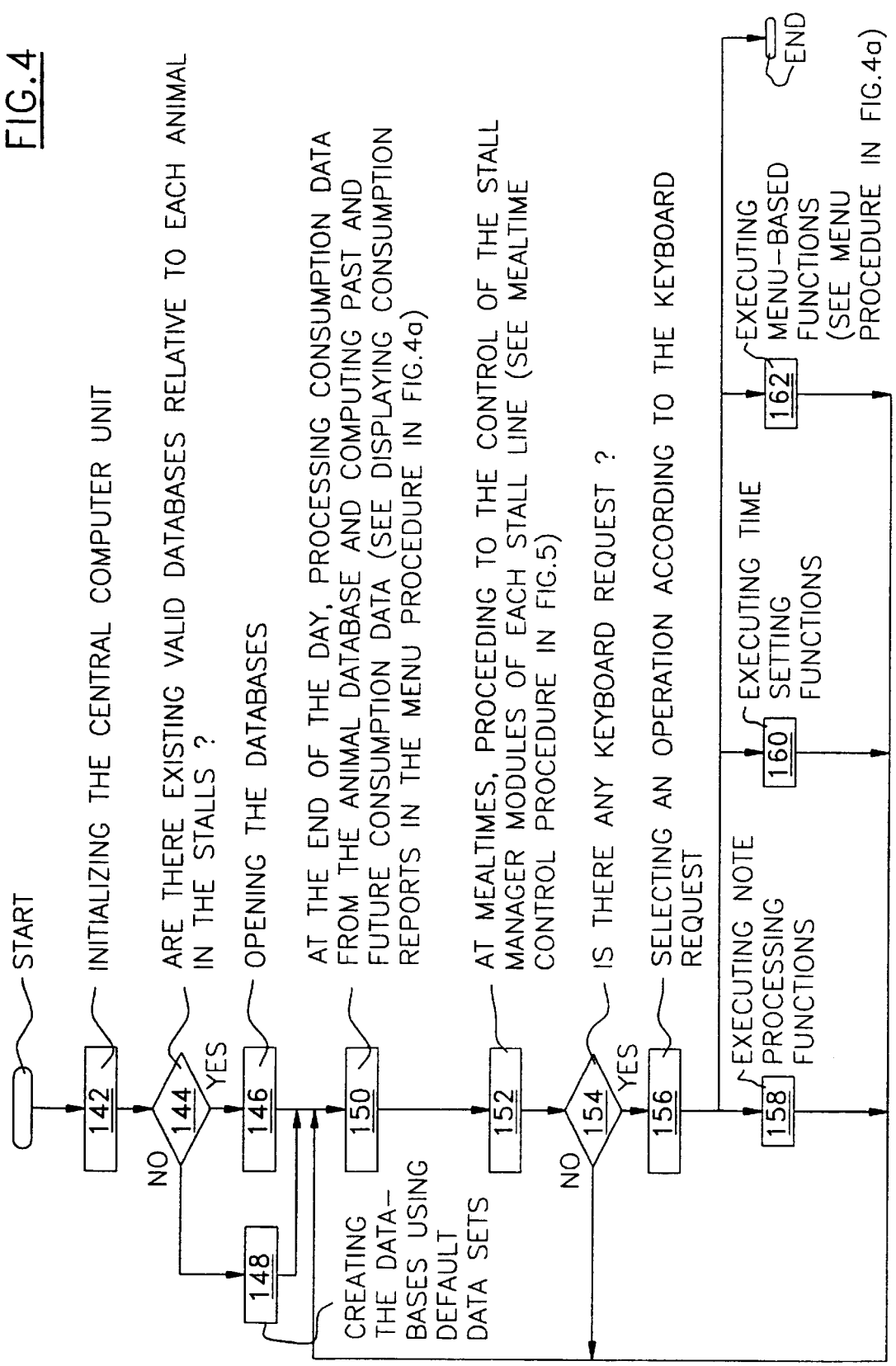

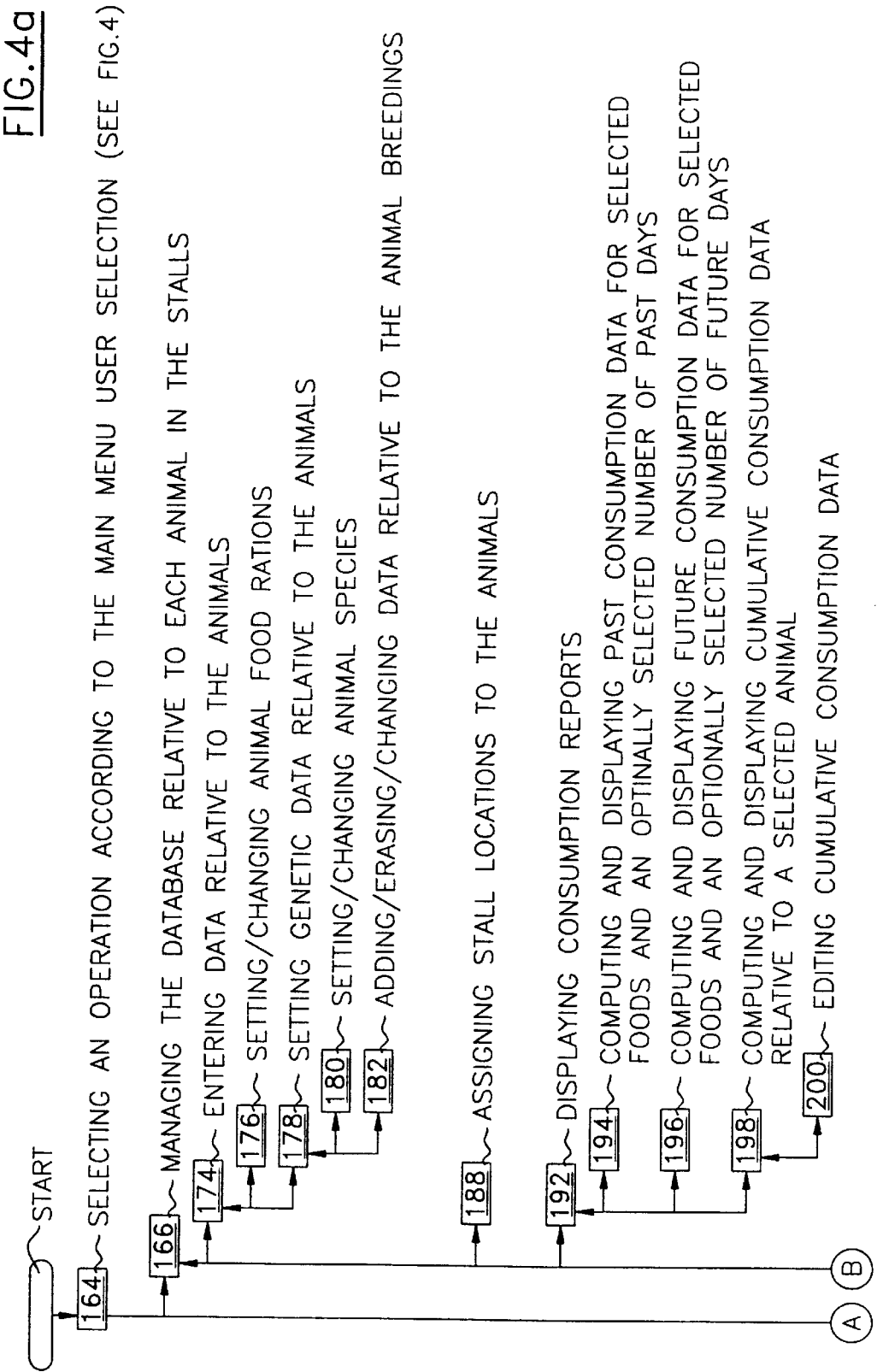

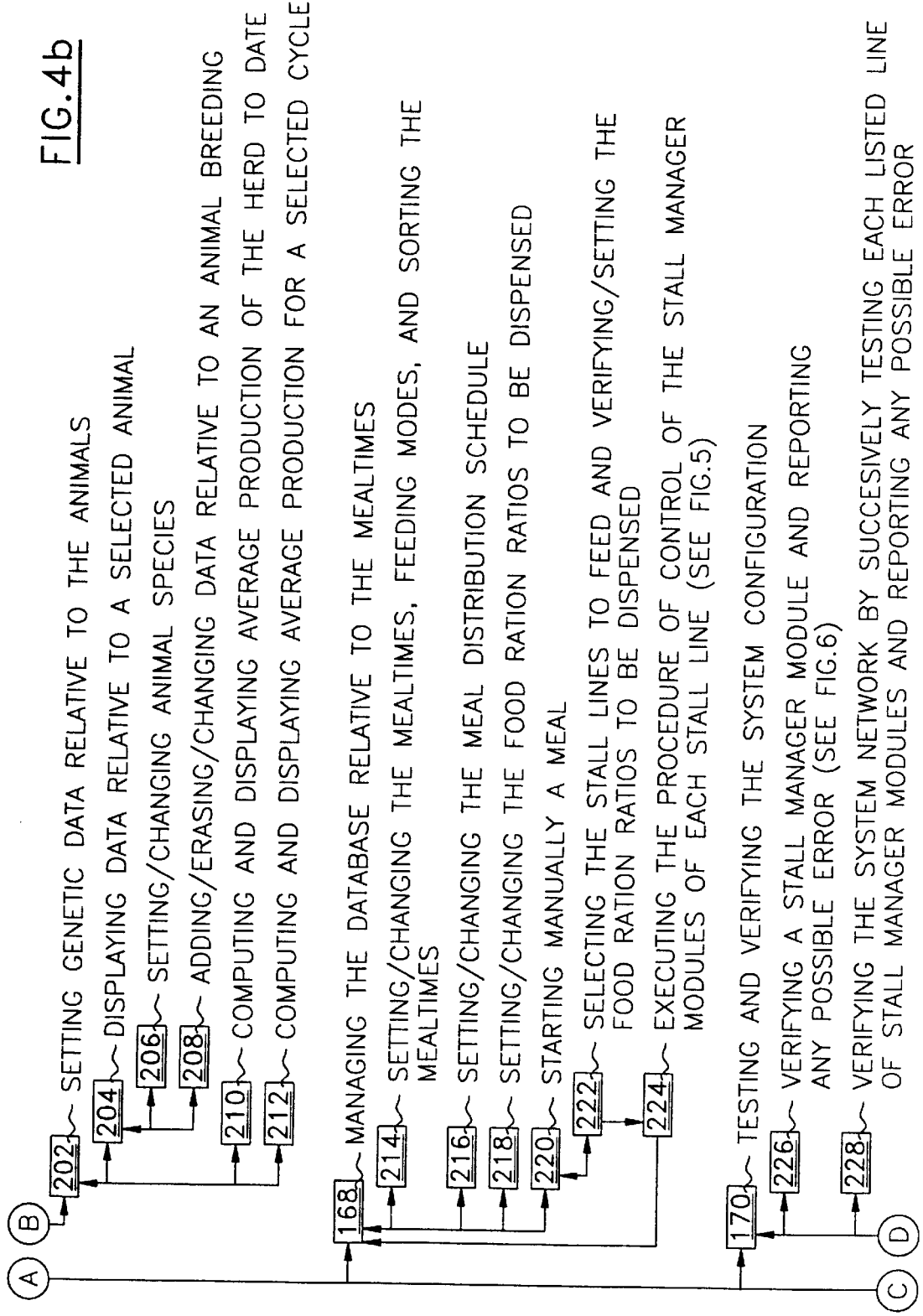

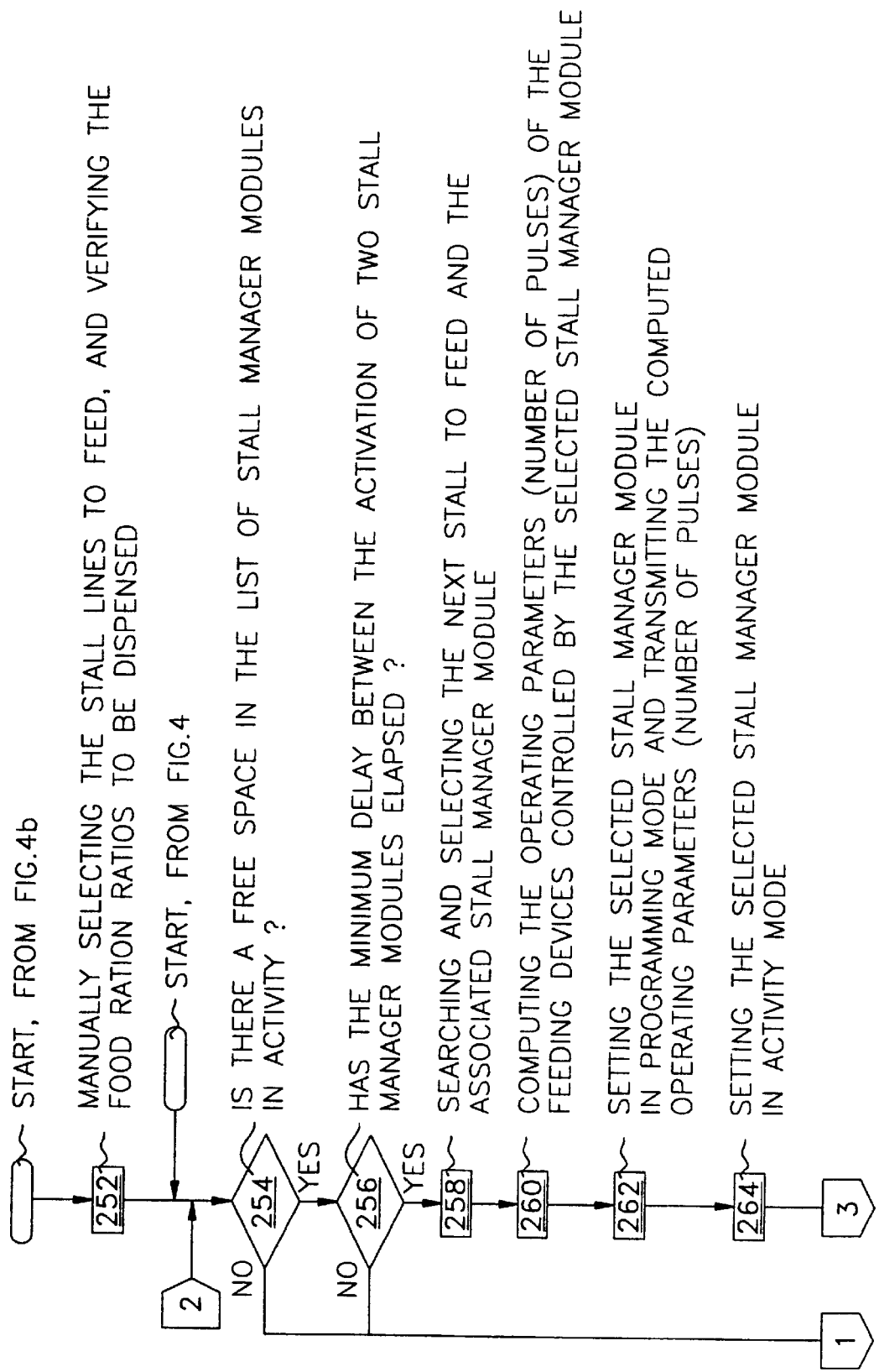

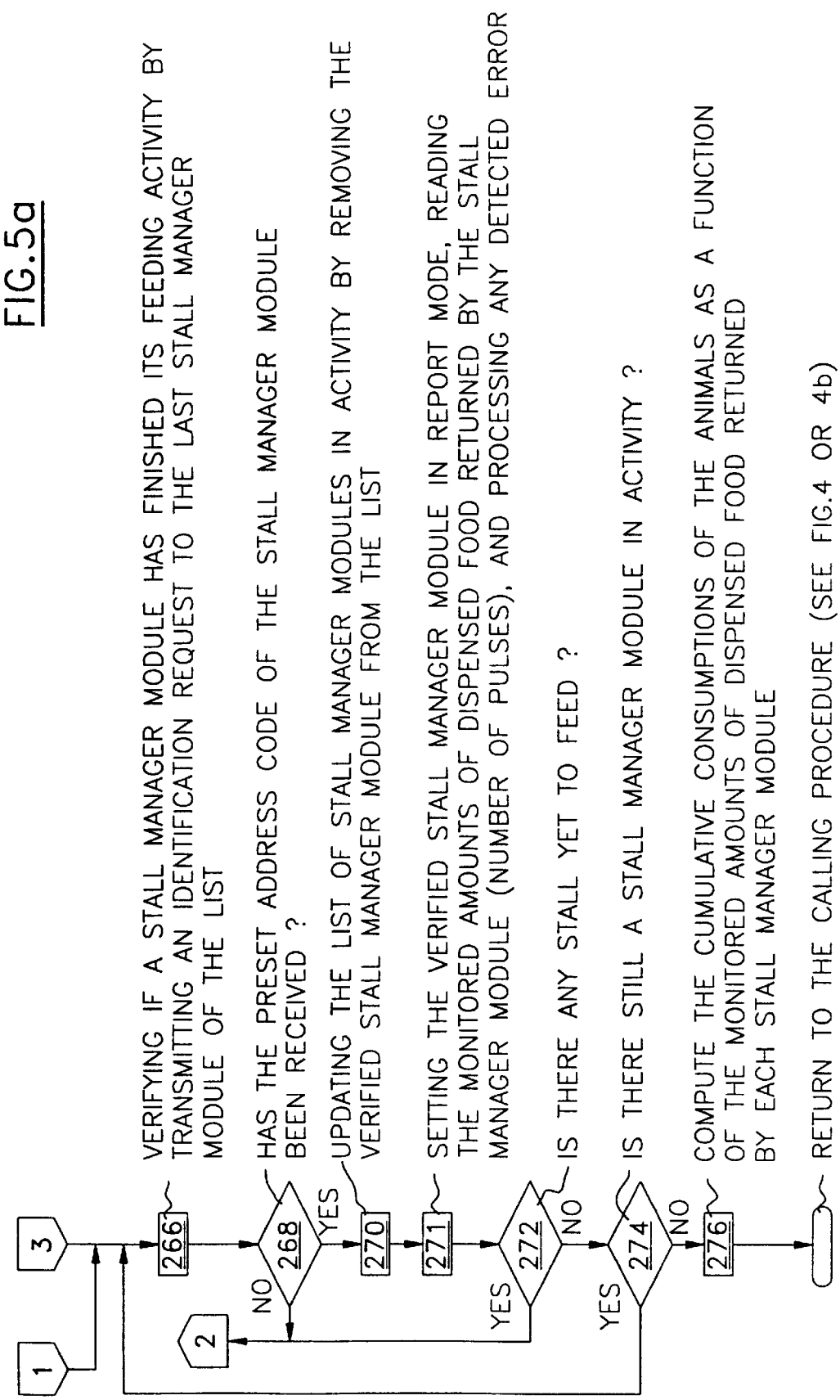

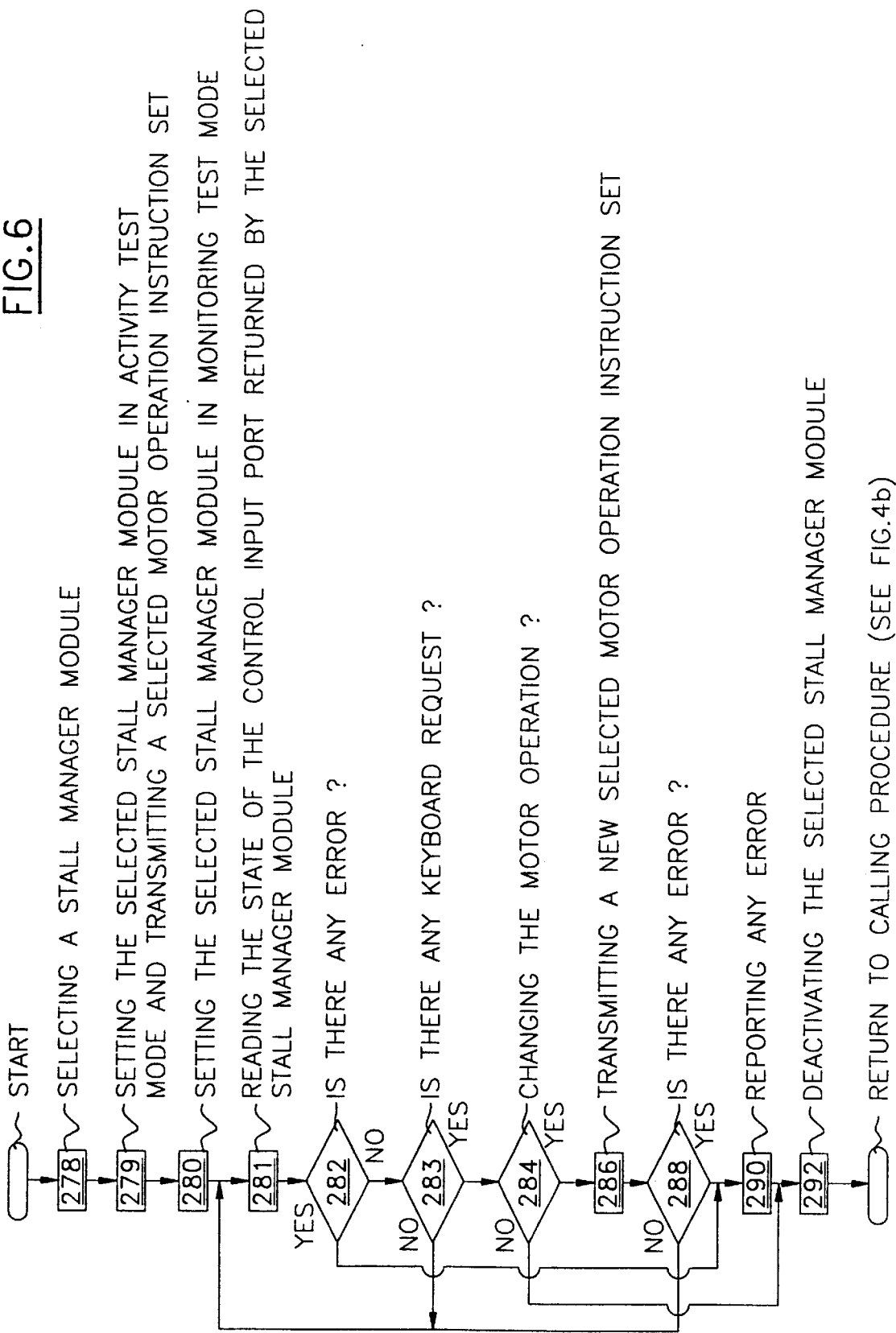

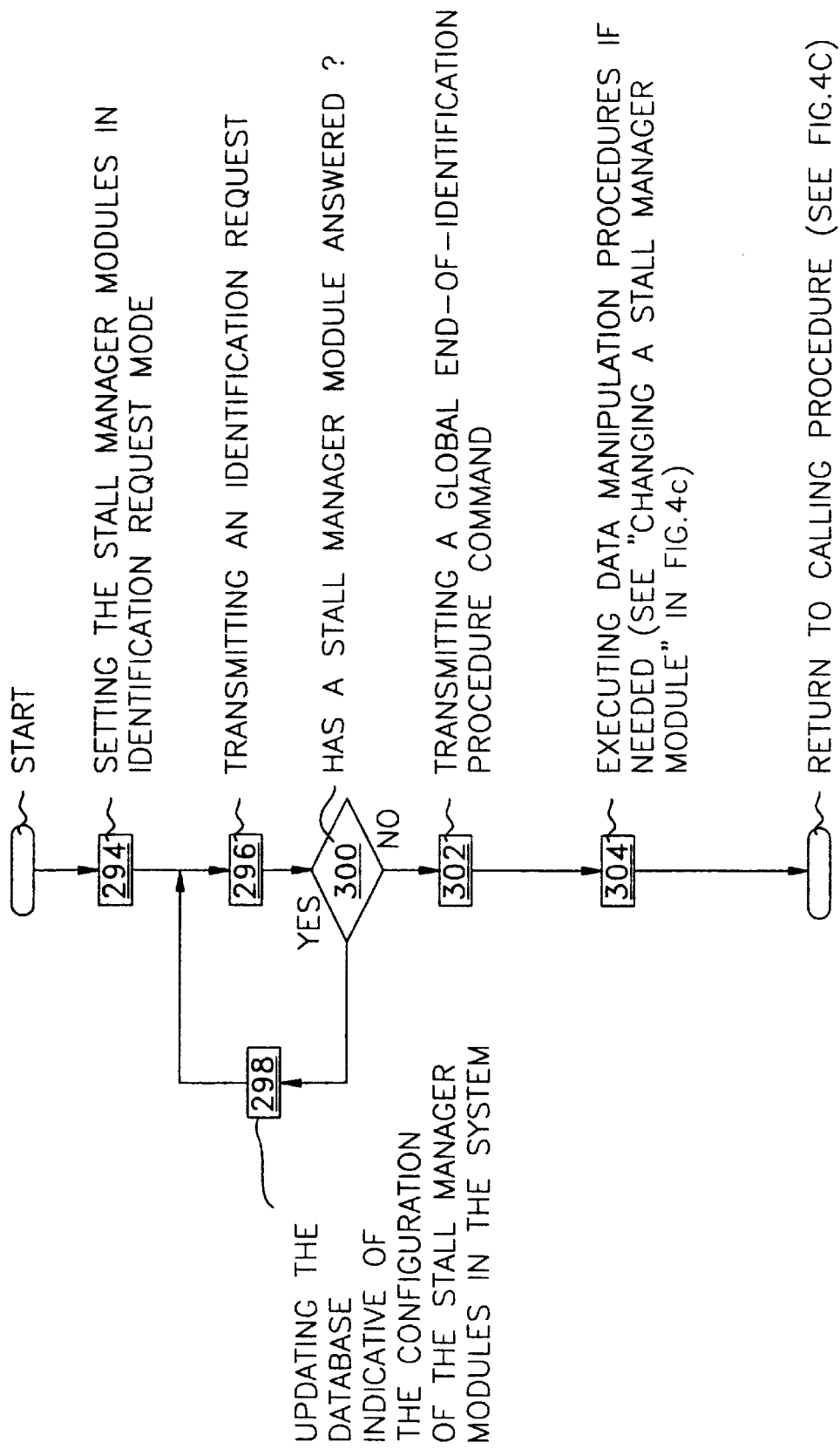

STALL MANAGER SYSTEM, MODULE AND FEEDING DEVICE FOR MANAGEMENT OF MEALTIMES AND FOOD DISTRIBUTION IN ANIMAL STALLS

BACKGROUND OF THE INVENTION

1. Field of the Invention

The invention generally relates to feeding of livestock in stalls, and more particularly to a stall manager system, module and feeding device for management of mealtimes and food distribution in animal stalls, and for execution thereof.

2. Description of Related Art

Known in the art is U.S. Pat. No. 4,981,107 (Beaudoin et al.), which describes a computerized automatic feeder system for feeding individual prescribed rations to animals confined in successive individual stalls aligned along a set path. The system is provided with a computer-assisted apparatus suspended under a railway following the set path, that moves from one stall to the other, prepares, at each stall, an individual ration for the animal in that stall, and dispenses the ration to the animal. Such a system is however slow and cumbersome.

There exist also feeding systems provided with conduits supplied with food and carrying the food over each stall where measuring hopper-like food containers, in communication with the conduits, are filled. The containers have a lower dispensing outlet provided with a valve that is either operated by a rope mechanism pulled manually or an automatic jack mechanism during mealtimes to dispense the food in the containers, which falls by gravity. However, moist food may jam the dispensers, and individual control of the automatic jack mechanisms requires installation of a complex and bulky power supply wiring network, notwithstanding the fact that there is no real provision relative to an overall automatic management of the system.

OBJECT OF THE INVENTION

It is therefore an object of the present invention to provide a stall manager system for controlling food distribution and mealtimes in a given number of animal stalls arranged in stall lines, which is relatively simple in design and is cost-effective, but yet which is highly functional and not subject to reliability problems due to the operating environment and conditions.

It is another object of the present invention to provide a stall manager module, which is especially adapted to such a system, for controlling at least one electronically controllable feeding device mounted in an animal stall in response to selective command messages addressed to the stall manager module from a central computer unit, which has enhanced efficiency and flexibility to provide real stall management functions.

It is another object of the present invention to provide an electronically controllable feeding device which is especially adapted to such a system, and is capable to dispense even low fluidity or moist food.

It is a subsidiary object of the present invention to provide such a system having low power supply needs and which can operate without requiring complex or bulky power supply wiring installation.

SUMMARY OF THE INVENTION

According to the present invention, there is provided a stall manager module for controlling at least one electronically controllable feeding device mounted in an animal stall in response to selective command messages addressed to the stall manager module from a central computer unit, the stall manager module comprising:

a first communication port for communication with the central computer unit;

a second communication port for communication with a next like stall manager module connected in series with the stall manager module;

a repeater circuit connected between the first and second communication ports for relaying data between the central computer unit and the next like stall manager module via the first and second communication ports, said repeater circuit having an enable repeat control input; and a data processing unit having:

a data input connected to the first communication port for receiving a command message from the central computer unit;

an address memory means for storing a preset unique address code for identifying the stall module manager;

means for detecting an address identifier and an instruction set in the command message received by the data input;

a means for comparing the address identifier with the address code stored in the address memory means and producing an internal recognition signal when the address identifier matches the address code;

a means responsive to the internal recognition signal, for producing feeding device control signals depending on the instruction set;

a control output port for transmitting the control signals to the at least one electronically controllable feeding device; and a repeater control output connected to the control input of the repeater circuit for controlling the repeater circuit.

According to the present invention, there is also provided a stall manager system for controlling food distribution and mealtimes in a given number of animal stalls arranged in stall lines, the system comprising:

a given number of electronically controllable feeding devices mounted in each one of the animal stalls, each one of the feeding devices having an inlet for receiving food, an outlet for dispensing the food, and an electric dispensing mechanism for controllably dispensing the food through the outlet in response to a supply voltage applied to the dispensing mechanism;

a stall manager module for each one of the animal stalls, for controlling the electronically controllable feeding devices mounted therein; and a central computer unit for management of food distribution and mealtimes relative to each of the feeding devices in each of the animal stalls, the central computer unit having a communication port for addressing selective command messages to the stall manager modules to accomplish the management;

each of the stall manager modules in one of the stall lines comprising:

a first communication port for communication with the central computer unit;

a second communication port for communication with a next one of the stall manager modules in the one of the stall lines and connected in series with the stall manager module;

a repeater circuit connected between the first and second communication ports for relaying data between the central computer unit and the next one of the stall manager modules via the first and second communication ports, said repeater circuit having an enable repeat control input; and a data processing unit having:

a data input connected to the first communication port for receiving a command message from the central computer unit;

an address memory means for storing a preset unique address code for identifying the stall module manager;

means for detecting an address identifier and an instruction set in the command message received by the data input;

a means for comparing the address identifier with the address code stored in the address memory means and producing an internal recognition signal when the address identifier matches the address code;

a means responsive to the internal recognition signal, for producing feeding device control signals depending on the instruction set;

a control output port for transmitting the control signals to the at least one electronically controllable feeding device; and a repeater control output connected to the control input of the repeater circuit for controlling the repeater circuit;

According to the present invention, there is also provided an electronically controllable feeding device comprising:

a container for storing food, the container having an upper inlet for receiving the food, and a lower outlet by which the food is let out;

a conveyor tray connected under the container, the conveyor tray having:

a channel having an end in communication with the lower outlet of the container for receiving the food, and an opposite end provided with a lower outlet for dispensing the food;

a pair of juxtaposed, rotatable helicoidal elements extending between both ends of the channel, for conveying the food therebetween upon rotation of the helicoidal elements, and a motor means for driving the pair of helicoidal elements in response to a power supply voltage applied thereto.

BRIEF DESCRIPTION OF THE DRAWINGS

In order to impart full understanding of the manner in which these and other objectives are attained in accordance with the present invention, preferred embodiments thereof are described hereinafter with reference to the accompanying drawings wherein:

FIG. 1 is a schematic diagram showing a stall manager system according to the present invention;

FIG. 2 is a schematic diagram showing a stall manager module according to the present invention;

FIGS. 3, 3a and 3b are flowcharts showing the operation of the stall manager module shown in FIG. 2;

FIG. 4 is a flowchart showing the general operation of a central computer unit in a stall manager system according to the present invention;

FIGS. 4a, 4b and 4c are flowcharts showing menu-based functions and operations implemented in the central computer unit;

FIGS. 5 and 5a are flowcharts showing feeding operations executed by the central computer unit during mealtimes;

FIG. 6 is a flowchart showing testing operations executed by the central computer unit for testing the stall manager modules in the system;

FIG. 7 is a flowchart showing identification operations executed by the central computer unit to identify the stall manager modules installed in the system;

DESCRIPTION OF THE PREFERRED EMBODIMENTS

Figure 4C:
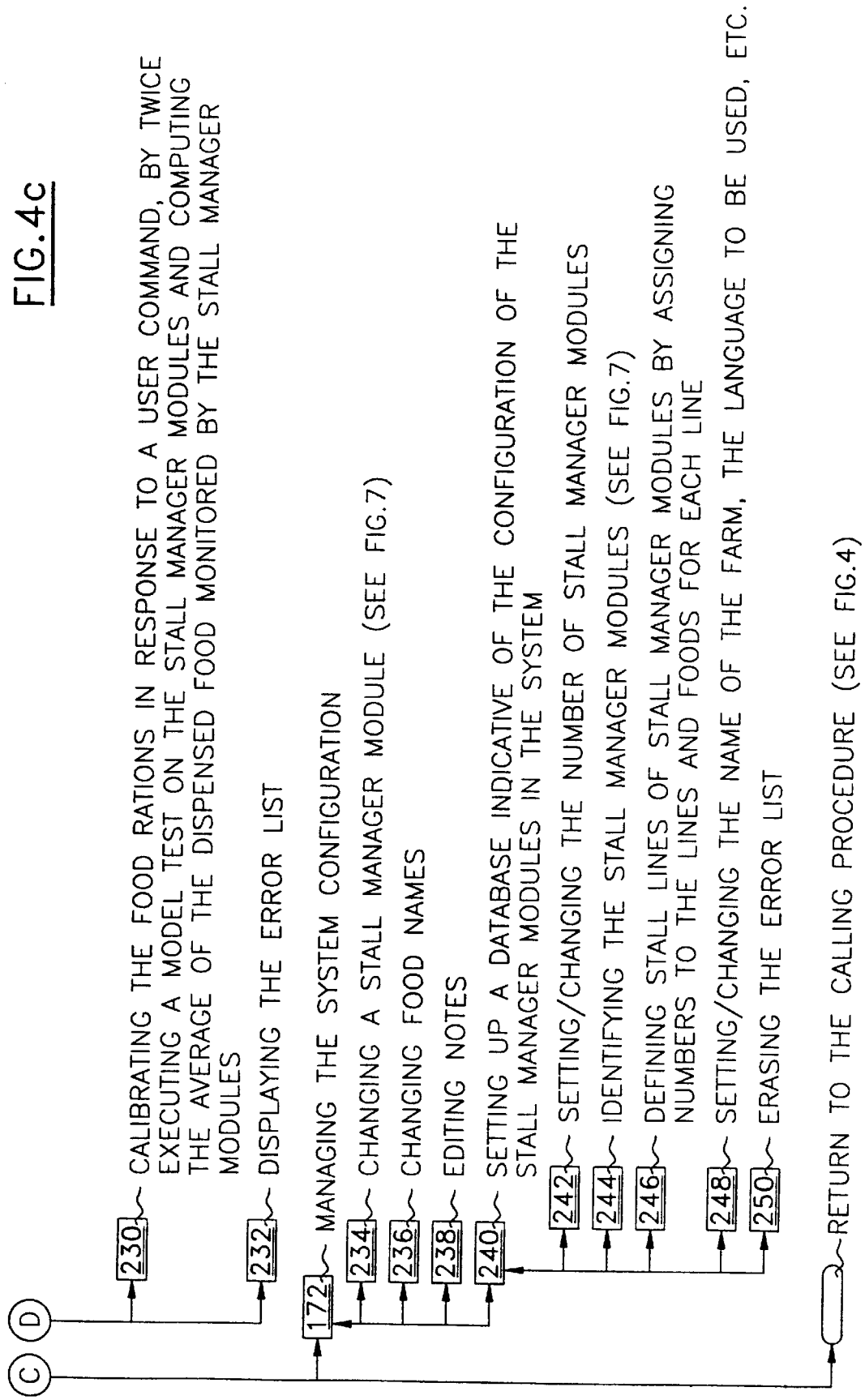

In the following description and in the drawings, like reference characters designate like or corresponding parts throughout the several views.

Referring to FIG. 1, there is shown a stall manager system according to the present invention, adapted to autonomously and automatically manage almost all operations required to feed animals lodged in the stalls of a stable. The system is based on the use of a central computer unit 2 to provide all the required resources for the remote control of stall manager modules 4 installed in each animal stall, as well as for the global management and monitoring of the system environment setting and operating conditions in relation with the feeding of the animals, as reported by the stall manager modules 4 or entered by the system user.

Figure 8:
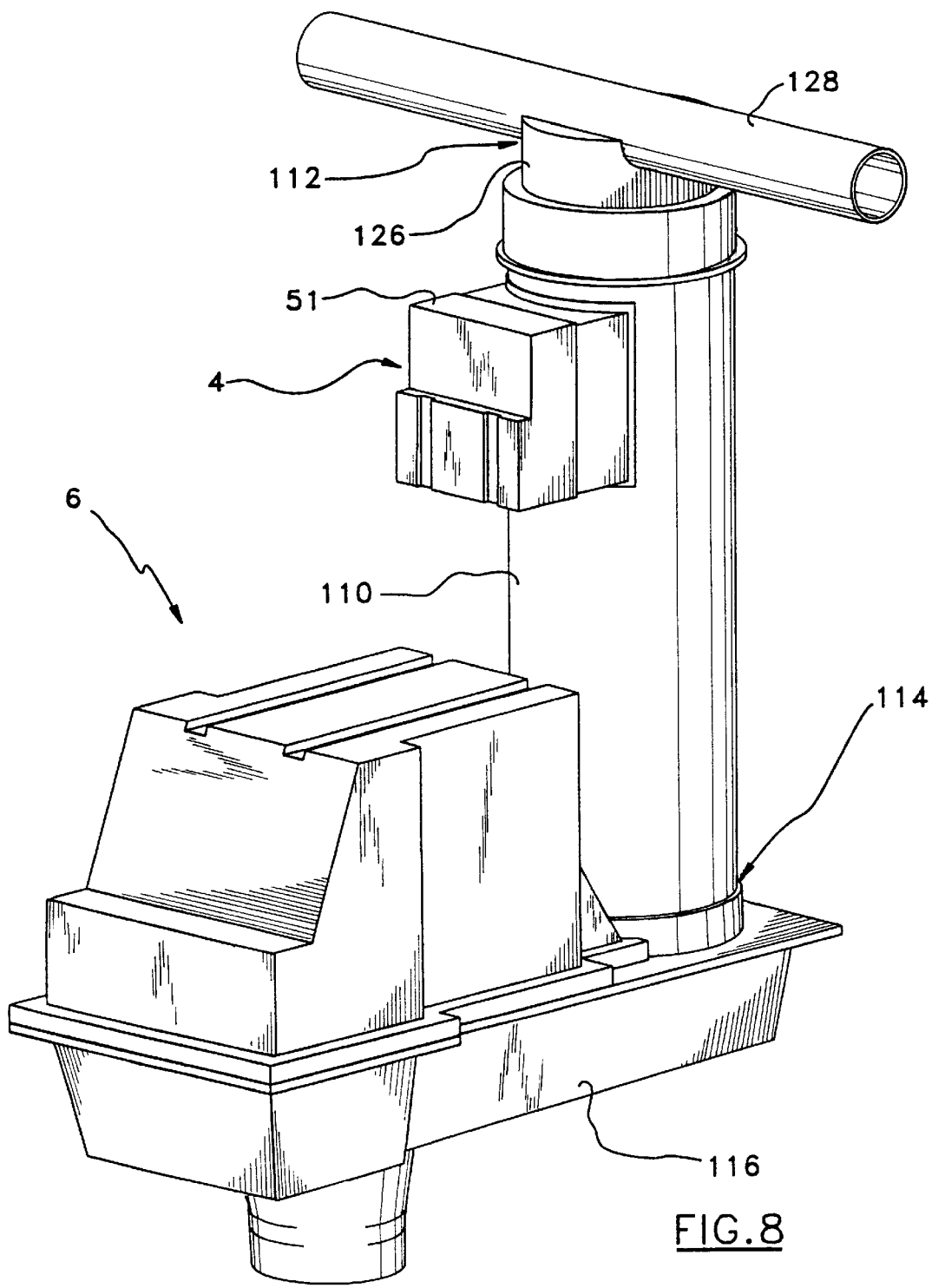
FIG. 8 is a perspective view of a feeding device according to the present invention.

Each of the stall manager modules 4 locally controls a given number of electronically controllable feeding devices 6 (as shown in FIG. 8) mounted in the animal stall, in response to selective command messages addressed to the stall manager module 4 from the central computer unit 2. Various types of feeding devices 6 can be used to dispense food (or liquids) in the stalls. For instance, as shown in FIG. 8, the feeding device 6 may consist of a container 110 connected to a food supply conduit 128, from which fluid food is extracted and dispensed via an outlet 122 by means of a motor driven conveyor mechanism 46, 123, 124 to which a rotary digital contacting encoder 125 is connected for monitoring and control purposes. The feeding device 6 may also conveniently consist of a solenoid valve device connected to a liquid supply conduit for dispensing for example water instead of solid food. Indeed, any feeding device 6 may be used in the system, as long as it provides an electronically controllable mechanism for dispensing the food.

The stall manager modules 4 are connected one after the other by means of series links 5, and each module 4 acts as a repeater. In order that the central computer unit 2 be capable of individually addressing a command message to a given stall manager module 4, each of them is assigned a preset unique address code. The protocol or format of the messages exchanged between the central computer unit 2 and the stall manager modules can advantageously take the following structure:

[header][address][instruction][optional additional instruction]

where:

the header is a predetermined data sequence indicating the beginning of a command message;

the address is a fixed length data sequence corresponding to the address of the stall manager module 4 to which the command message is intended or a universal address if the command message is addressed to all the stall manager modules;

the instruction is a fixed length data sequence indicating the action that the stall manager module must execute; and the optional additional instruction is a variable length data sequence indicating optional parameters relating to the instruction if applicable. Command messages used to control the stall manager modules 4 may be as follows:

[0] to indicate to the stall manager module 4 to execute a reset;

[1] to indicate to the stall manager module to transmit its preset address code;

[2] to indicate to the stall manager module 4 that it must receive an additional instruction relating to the amount of food that the feeding devices 6 attached to the stall manager module 4 must dispense, in terms of motor turns, motor operating time periods or like programmable parameters;

[3] to indicate to the stall manager module 4 to operate the associated feeding devices 6 according to the programmed parameters;

[4] indicates to the stall manager module 4 that it must return the monitored amount of food dispensed by each of the associated feeding devices 6, in terms of motor turns, motor operating time periods or like parameters indicative of the amount of dispensed food;

[5] indicates to the stall manager module 4 that its control output port attached to the associated feeding devices 6 must produce control signals according to the additional instruction contained in the command message;

[6] indicates to the stall manager module 4 that it must transmit the signals received from its control input port; and

[7] indicates to the stall manager module 4 that it must enter into identification mode.

Figure 9:
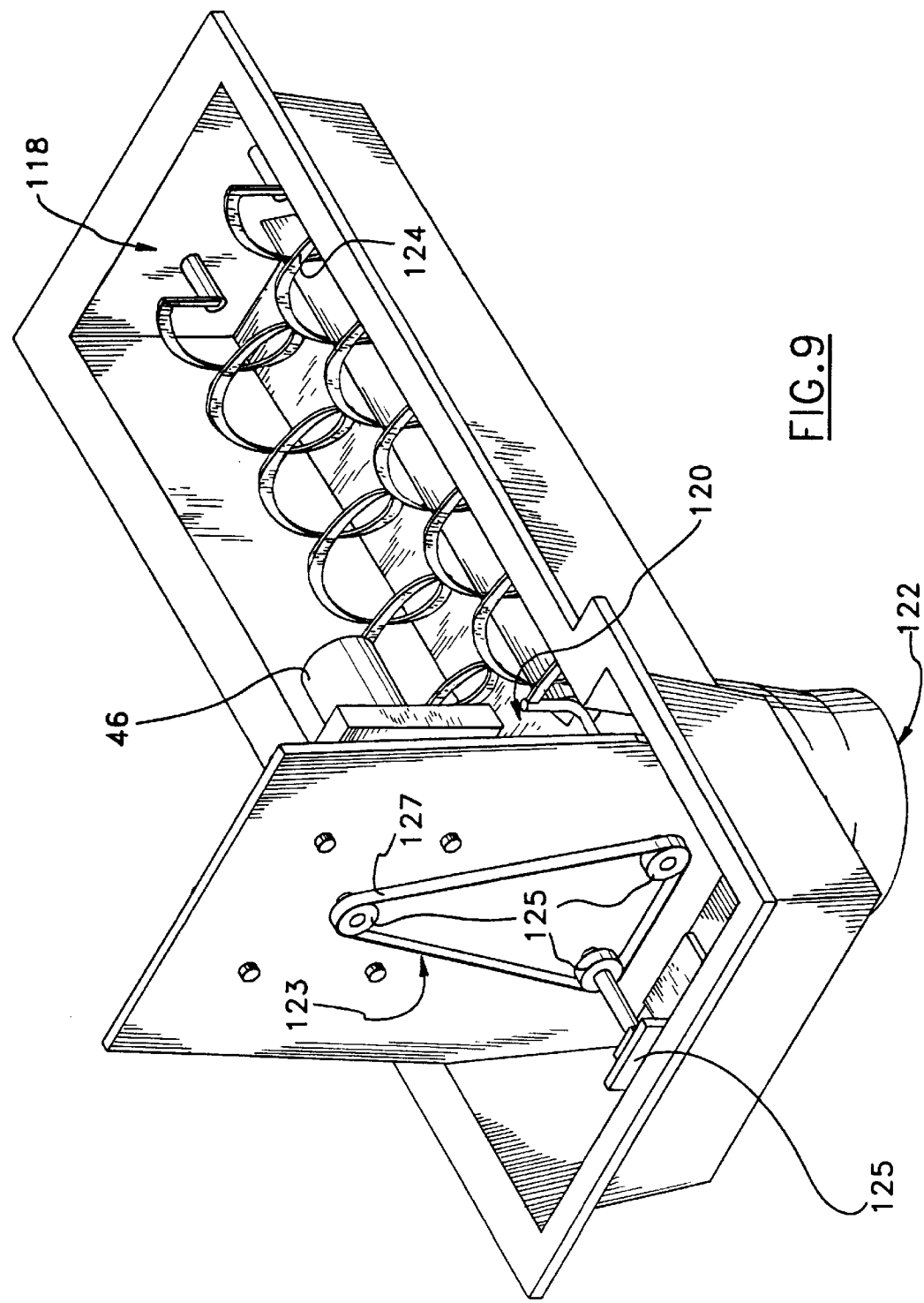
FIG. 9 is a perspective view showing the inside of the dispenser tray of the feeding device shown in FIG. 9.

For a feeding device 6 as shown in FIGS. 8 and 9, the additional instruction contained in the message command [2] indicates a number of pulses that the rotary digital contacting encoder 125 must emit during operation of the feeding device 6, while the parameter returned in response to the message command [4] is the monitored number of pulses that the rotary digital contacting encoder 125 has emitted during operation of the feeding device 6.

The purpose of these command messages will be better understood hereinafter.

Referring to FIG. 2, there is shown an electronic circuit of a stall manager module 4 (as shown in FIG. 1) used to control up to four electronically controllable feeding devices 6 (as shown in FIGS. 8 and 9). The stall manager module 2 has a first communication port 8 (A) for communication with the central computer unit 2 (as shown in FIG. 1), and a second communication port 10 (B) for communication with a next like stall manager module 4 connected in series with the stall manager module 4 (see FIG. 1). A repeater circuit 12 is interconnected between the first and second communication ports 8, 10 for relaying data between the central computer unit 2 and the next like stall manager module 4 via the first and second communication ports 8, 10. The repeater circuit 12 has an enable repeat control input 13 by means of which the operation of the repeater circuit 12 is controllable.

At the heart of the stall module manager 4 is a data processing unit 14 which performs all the feeding activity and functions prescribed by the central computer unit. To this effect, the data processing unit 14 has a data input 16 connected to the first communication port 8 for receiving a command message from the central computer unit 2. The data processing unit 14 also has an address memory (that may take the form of a chip memory, a dip switch panel or any other suitable device) for storing a preset unique address code that identifies the stall module manager 4 among the other ones (the use of 4 bytes provides $2^{32}$ possible address codes). To facilitate the installation of the stall manager modules 4, they can be for example manufactured by groups whose address codes begin by a multiple of a hundred. Thus, if a user ulteriorly wants to add a second set of stall manager modules 4 in its system, he will buy a group beginning with the address code of 200, as the first group in place begins by the address code 100, therefore avoiding complex address settings as it is often the case in the prior art systems.

The data processing unit 14 further has a logic mechanism for detecting an address identifier and an instruction set in the command message received by the data input 16, a logic mechanism for comparing the address identifier with the address code stored in the address memory and producing an internal recognition signal when the address identifier matches the address code or the universal address, a logic mechanism responsive to the internal recognition signal, for producing feeding device control signals depending on the instruction set, a control output port 18 for transmitting the control signals to the electronically controllable feeding devices 6 (in the form of power supply voltages in the case of feeding devices as shown in FIGS. 8 and 9), and a repeater control output 20 connected to the control input 13 of the repeater circuit 12 for controlling the repeater circuit 12. All the above mentioned logic mechanisms can conveniently be implemented and embodied in a PIC 16C54 controller chip or any other suitable logic circuit device forming the data processing unit 14.

Operation report data may be transmitted to the central computer unit 2 by means of a data output 22 of the data processing unit 14, connected to the first communication port 8.

To enhance the management, or when required by the type of feeding device 6 used in the system, the actual amounts of food dispensed by the feeding devices 6 are obtained by means of a control input port 24 of the data processing unit 14, for receiving signals indicative of the actual amounts of food dispensed by the feeding devices 6, as issued by rotary digital contacting encoders 125 (as shown in FIG. 9) mounted onto the feeding devices 6.

The stall manager module 4 has a receiver circuit 26 having inputs 28 connected to both first and second communication ports 8, 10, and outputs 30 connected to the repeater circuit 12 and the data input 16 of the data processing unit 14. The stall manager module 4 also has a transmitter circuit 32 having an input 34 connected to the data output 22 of the data processing unit 14, an output 36 connected to the first communication port 8, and an enable send control input 38, connected to a transmitter control output 40 of the data processing unit 14 for controlling the transmitter circuit 32. For technical reasons (the sharing of the communication port 8 by both the repeater circuit 12 and the transmitter circuit 32), the repeater circuit 12 is deactivated during operation of the transmitter circuit 32, and vice versa.

The data processing unit 14 further has RAM units for storage of temporary or programmable data, ROM units for storage of stall management procedures that are selectively activated depending on the instruction set contained in the command message issued from the central computer unit 2, a logic mechanism responsive to the internal recognition signal for detecting a command and optional operation data in the instruction set, and a logic mechanism for executing one of the stall management procedures stored in the ROM units depending on the command. These logic mechanisms can also conveniently be implemented and embodied in a PIC 16C54 controller chip or any other suitable logic circuit device forming the data processing unit 14.

Preferably, the control input and output ports 24, 18 are protected by opto-couplers 42. Power MOS transistors 44 drive the feeding device motors 46 (as shown in FIG. 9). A non-protected input connector 48 may be provided via jumpers 50 if desired. The data processing unit 14 is provided with a power failure detector 15.

While the method used to control a feeding device 6 as shown in FIGS. 8 and 9 consists of monitoring the pulses emitted by the rotary digital contacting encoder 125 during feeding activity, other control methods could be also used, as by operating the feeding device 6 for a preset time period depending on the dispensing rate of the feeding device 6 using a timer mechanism integrated in the data processing unit 14.

Referring to FIG. 8, the stall manager module 4 can be mounted onto one of the feeding devices 6 installed in the stall, by means of an appropriate fixture 51.

Referring now to the flowcharts in FIGS. 3, 3a and 3b, there is shown a non-limitative example of how the stall manager module 4 shown in FIG. 2 operates. Once activated, the data processing unit 14 of the stall manager module 4 initializes its communication ports 8, 10 in repeater mode (step 52), before reading incoming data received via the communication port 8 (in communication with the central computer unit 2) (step 54), in search of a protocolar command message header in the data (step 56). Upon detection of such a header, the data processing unit 14 decodes an address identifier in the data (step 58), to see whether the command message issued by the central computer unit 2 is addressed to it or not. If the address identifier matches the preset unique address code stored in the address memory of the stall manager module 4 or corresponds to a universal address code recognized by all the stall manager modules 4 of the system (step 60), then the data processing unit 14 decodes an instruction set contained in the data (step 62), and executes one of the preprogrammed stall management procedures depending on the instruction set (step 64), each procedure corresponding to a particular operating mode represented by a circled number in the Figures, and Listed as follows:

[0] reset mode;
[1] identification send mode;
[2] programming mode;
[3] activity mode;
[4] report mode;
[5] activity test mode;
[6] monitoring test mode; and
[7] identification request mode.

As it can be easily seen, each mode corresponds to a command message that the central computer unit can possibly issue. Of course, other modes can be implemented if desired.

The procedure executed in the reset mode [0] consists of resetting the stall manager module before returning in normal operation (step 66).

The procedure executed in the identification send mode [1] consists of deactivating the repeater circuit 12 (for technical reasons only), transmitting the address code stored in the address memory via the data output 22 of the data processing unit 14 while activating the transmitter circuit 36 for transmitting the address code to the central computer unit 2 via the first communication port 8 (step 68), and reactivating the repeater circuit 12.

The procedure executed in the programming mode [2] consists of storing into the RAM units of the data processing unit 14 the operating parameters of the feeding devices 6 (number of pulses to be emitted by the rotary digital contacting encoders 125 of each feeding device 6 during feeding activity) according to the operation data contained in the command message received from the central computer unit 2 (step 70), in order to adjust the amounts of food that the feeding devices must dispense during the mealtime. To ensure data integrity, a checksum validation is transmitted to the central computer unit 2 (step 71).

The procedure executed in the activity mode [3] consists of producing the feeding device control signals via the control output port 18 of the data processing unit 14 according to the programmed operation parameters (step 72), monitoring the signals indicative of the actual amounts of food dispensed by the feeding devices 6 (in terms of a number of pulses emitted by the encoder 125) from the control input port 24 of the data processing unit 14 (step 74) in order to deactivate the feeding devices 6 once they have dispensed the prescribed amounts of food (step 75), until all the feeding devices 6 have stopped their activity (step 76).

The procedure executed in the report mode [4] consists of transmitting the monitored amounts of dispensed food (in terms of numbers of pulses) via the data output 22 of the data processing unit 14, while activating the transmitter circuit 32 for transmitting the monitored amounts to the central computer unit 2 via the first communication port 8 (step 78).

The procedure executed in the activity test mode [5] consists of waiting for a predetermined verification code transmitted by the central computer unit 2 (steps 80, 82, 84, 86), detecting a motor operation instruction set in the command message transmitted by the central computer unit 2 (step 88) and producing the feeding device control signals via the control output port 18 of the data processing unit 14 according to the operation data in order to activate the feeding devices 6 (step 90).

The procedure executed in the monitoring test mode [6] consists of successively monitoring the state of the control input port 24 via the jumpers 50 (step 92), and transmitting in real time the state via the data output 22 of the data processing unit 14 while activating the transmitter circuit 32 for transmitting the monitored amounts of dispensed food to the central computer unit 2 via the first communication port 8 (step 94).

The procedure executed in the identification request mode [7] consists of successively deactivating the repeater circuit 12 (step 96), detecting an identification request in a command message received by the data input 16 of the data processing unit 14 (steps 98, 100), transmitting the address code stored in the address memory via the data output 22 of the data processing unit 14 while activating the transmitter circuit 32 for transmitting the address code via the first communication port 8 (steps 102), reactivating the repeater circuit 12 (step 104), and waiting for a global end-of-identification-procedure command in a command message received by the data input 16 of the data processing unit 14, to resume to normal operation (steps 106, 108). During the waiting, any identification request is automatically transferred to the next stall manager module 4 in line via the repeater circuit 12.

With reference to the flowchart in FIG. 7, the central computer unit 2 therefore initially sets the stall manager modules 4 in identification request mode (step 294), using the universal address recognized by all the stall manager modules 4 and then issues identification requests one after the other (step 296) and updates the database indicative of the stall manager modules installed in the system (step 298), until it does not receive any address code in return (step 300), which means that there are no more stall manager modules 4 than those having answered the requests. The central computer unit 2 then issues a global end-of-identification-procedure command (step 302). Thus, the central computer unit 2 can establish a list of the address codes of the stall manager modules in the system, and determine their number (step 304).

The identification request mode allows the central computer unit 2 to obtain the address code of each stall manager module 2 connected in the system. Such a procedure spares the user the trouble of manually entering the address codes of the stall manager modules 2 and therefore eliminates human errors.

Referring to FIGS. 8 and 9, there is shown an electronically controllable feeding device 6 specially adapted for the system according to the present invention. Of course, such a feeding device 6 can be also used in any other convenient system for dispensing food. The feeding device 6 comprises a container 110 for storing food. The container 110 has an upper inlet 112 for receiving the food, and a lower outlet 114 by which the food is let out by gravity, to fall into a conveyor tray 116 connected under the container 110.

The conveyor tray has an inner channel having an end 118 in communication with the lower outlet of the container 110 for receiving the food, and an opposite end 120 provided with a lower outlet 122 for dispensing the food. A pair of juxtaposed, rotatable helicoidal elements 124 extend between both ends 118, 120 of the channel, for conveying the food therebetween upon rotation of the helicoidal elements 124. The helicoidal elements are driven by a motor 46 via an arrangement 123 of sprocket wheels 125 engaging with a chain 127 for transmitting torque from the motor 46 to the helicoidal elements 124, in response to a power supply voltage (i.e. the control signal produced by the stall manager module 4) applied to the motor 46. Of course, belt and pulleys could replace the chain 127 and sprocket wheels 125. The container 110 has an upper end provided with a bracket 126 for attaching the container 110 to a food carrying conduit 128 in communication with the upper inlet 112 of the container 110.

Although the use of the above mentioned feeding device 6 is advantageously suggested for the stall manager system according to the present invention, other types of feeding devices may also suit the needs, as long as they comprise an inlet for receiving food, an outlet for dispensing the food, and an electric dispensing mechanism for dispensing the food through the outlet in response to a control signal applied to the dispensing mechanism. Other dispensing mechanisms can also be used, even if this involves minor modifications to carry out in the way the associated stall manager module produces the control signals, as it would be the case with a sophisticated feeding device having distinct control and power supply lines.

Referring again to FIG. 1, the stall manager system further comprises, for each one of the stall lines, a pair of power supply sources 128, 130 for producing two distinct power supply voltages adapted respectively for the stall manager modules 4 and the electronically controllable feeding devices 6 of the stall line in question. A pair of electric lines 132, 134 carry the power supply voltages produced by the power supply sources 128, 130 to the stall manager modules 4 and the electronically controllable feeding devices 6 of the stall line. A supply controller 136 is interconnected between the power supply sources 128, 130 and the electric lines 132, 134. The supply controller 136 has first and second interconnected communication ports 138, 140 for communication with the central computer unit 2 and communication with a first one of the stall manager modules 4 in a corresponding one of the stall lines respectively, and controllable switch mechanisms to cause application of the power supply voltages on the electric lines 132, 134. The power supply sources 128 for electronics may conveniently consist of rechargeable batteries which are electrically isolated from the power supply sources 130 for the motors 46 of the feeding devices 6, and thus provide a cleaner current for the electronics. The power supply sources 130 for the motors 46 of the feeding devices 6 may consist of AC/DC transformers connected to an AC network or batteries.

Referring now to the flowchart in FIG. 4, there is shown a non-limitative example of how the central computer unit 2 shown in FIG. 1 operates. The central computer unit 2 provides database resources containing information relative to feeding processes for each animal in the stalls in correlation with the stall manager modules 4 and the feeding devices 6 of the stall manager system. The central computer unit 2 also provides resources for managing the database resources in response to user or device requests (keyboard or internal logic mechanisms). Schedule resources are also provided, for scheduling mealtimes. The central computer unit 2 is also provided with resources for issuing the command messages to the stall manager modules 4 for controlling the food distribution in the animal stalls during the mealtimes according to the information contained in the database resources, and for collecting the monitored amounts of dispensed food from the stall manager modules 4 after the mealtimes.

Once activated, the central computer unit 2 initializes all its resources (step 142), and checks whether there exist valid databases relative to each animal in the stalls (step 144). In such a case, the databases are opened (step 146), otherwise databases are created using default data sets (step 148). At the end of each day, the central computer unit 2 processes the consumption data from the animal database (as collected from each stall manager module 4 in the system during the day), and computes past and future consumption data (step 150). At mealtimes, the central computer unit 2 proceeds to the control of the stall manager modules 4 of each stall line (step 152). Upon a keyboard request from the user (step 154), the central computer unit 2 executes either note processing functions, time setting functions or menu-based functions (steps 156, 158, 160, 162).

Referring to FIG. 4a, there is shown an example of the menu-based functions implemented in the central computer unit 2. The operation is selected according to a main menu user selection (step 164). The numerous functions implemented in the central computer unit 2 can be grouped in 4 main categories, namely to manage the database relative to each animal in the stalls (step 166), to manage the database relative to the mealtimes (step 168), to test and verify the system configuration (step 170), and to manage the system configuration (step 172). Each of these functions leads to sub-levels of functions (steps 174 to 250) forming a hierarchy as depicted in the Figures, in order to have complete control over the largest number of variable operating parameters of the system. It should be apparent for a person skilled in the art that many other functions can be implemented in the system, such as the use of growth curves to automatically adjust the amounts of food to dispense according to the animals' ages and physical properties.

Referring to the flowcharts in FIGS. 5 and 5a, there is shown a non-limitative example of how the central computer unit 2 proceeds to the control of the stall manager modules 4 at mealtimes, or at a manually user-activated mealtime. According to an aspect of the present invention, the central computer unit 2 controls the current flowing through the power supply lines 132, 134 to allow the use of smaller sized electric cables and power supply sources having lower capacities. Thus, by controlling the number of motors 46 simultaneously in activity, the average current is limited. By setting a delay between the starting of each motor 46, the current peaks are limited. To this effect, the central computer unit 2 sets a limited number of stall manager modules 4 that can be simultaneously in activity, by creating a list dimensioned according to this number, which will be used to identify the stall manager modules 4 in activity.

In case a mealtime has been manually initiated by the user, the stall lines to feed are manually selected by the user, and the food ration ratios to be dispensed are verified (step 252). Then, whatever the case, the central computer unit 2 verifies if the list is full (step 254). If it is not the case, then the central computer unit 2 verifies if the minimum delay between the starting of another stall manager module 4 is respected (step 256). If it is the case, then the next stall to feed is searched and the associated stall manager module 4 is selected (step 258). The operating parameters of the feeding devices are computed (step 260) and transmitted to the selected stall manager module 4 (step 262). The selected stall manager module is set in activity mode (step 264). The central computer unit then verifies if a stall manager module 4 has finished its feeding activity by transmitting an identification request to the last manager module of the list (step 266). If the preset address code is returned by the verified stall manager module 4 (step 268), which means that it has finished its feeding activity, then it is removed from the list (step 270) and it is set in report mode and the returned monitored amounts of dispensed food are collected (step 271). The central computer unit 2 verifies if there is any stall yet to feed (step 272), in which case the above process is repeated until there are no more stall manager modules in activity (step 274). Then, the central computer unit 2 computes the cumulative consumptions of the animals as a function of the amounts of food collected in step 271 (step 276).

Referring to the flowchart in FIG. 6, there is shown a non-limitative example of how the central computer unit 2 proceeds to test a stall manager module 4. A stall manager module 4 to be tested is first selected (step 278), and is set in activity test mode after which a selected motor instruction set is transmitted to the stall manager module 4 (step 279). The stall manager module 4 is then set in monitoring test mode (step 280) and the state of its control input port 24 is collected by the central computer unit 2 (step 281) to detect and report any error (steps 282, 290), otherwise either the operation of the stall manager modules 4 is changed (steps 283, 284, 286, 288) or the stall manager module is deactivated (step 292).

Although the present invention has been explained hereinbefore by way of preferred embodiments thereof, it should be pointed out that any modifications to these preferred embodiments, within the scope of the appended claims, are not deemed to change or alter the nature and scope of the present invention.

What is claimed is:

1. A stall manager module for controlling at least one electronically controllable feeding device mounted in an animal stall in response to selective command messages addressed to the stall manager module from a central computer unit, the stall manager module comprising:

a first communication port for communication with the central computer unit;

a second communication port for communication with a next like stall manager module connected in series with the stall manager module;

a repeater circuit connected between the first and second communication ports for relaying data between the central computer unit and the next like stall manager module via the first and second communication ports, said repeater circuit having an enable repeat control input; and a data processing unit having:

a data input connected to the first communication port for receiving a command message from the central computer unit;

an address memory means for storing a preset unique address code for identifying the stall module manager;

means for detecting an address identifier and an instruction set in the command message received by the data input;

a means for comparing the address identifier with the address code stored in the address memory means and producing an internal recognition signal when the address identifier matches the address code;

a means responsive to the internal recognition signal, for producing a feeding device control signal depending on the instruction set;

a control output port for transmitting the control signal to the at least one electronically controllable feeding device; and a repeater control output connected to the control input of the repeater circuit for controlling the repeater circuit.

2. A stall manager module according to claim 1, wherein the data processing unit further has:

a data output connected to the first communication port for transmitting operation report data to the central computer unit.

3. A stall manager module according to claim 2, wherein the data processing unit further has:

a control input port for receiving a signal indicative of an actual amount of food dispensed by the at least one feeding device.

4. A stall manager module according to claim 3, further comprising:

a receiver circuit having inputs connected to both first and second communication ports, and outputs connected to the repeater circuit and the data input of the data processing unit; and a transmitter circuit having an input connected to the data output of the data processing unit, an output connected to the first communication port, and an enable send control input;

and wherein:

the data processing unit has a transmitter control output connected to the control input of the transmitter circuit for controlling the transmitter circuit.

5. A stall manager module according to claim 4, wherein said data processing unit further has RAM means for storage of temporary or programmable data, ROM means for storage of stall management procedures that are selectively activated depending on the instruction set, means responsive to the recognition signal for detecting a command and optional operation data in the instruction set, and means for executing one of the stall management procedures stored in the ROM means depending on the command.

6. A stall manager module according to claim 5, wherein:
one of the stall management procedures consists of transmitting the address code stored in the address memory means via the data output of the data processing unit, while activating the transmitter circuit for transmitting the address code via the first communication port.

7. A stall manager module according to claim 5, wherein:
one of the stall management procedures consists of storing into the RAM means an information indicative of a prescribed amount of food to be dispensed by the at least one of the feeding devices according to the operation data; and
another one of the stall management procedures consists of producing the feeding device control signal via the control output port of the data processing unit, monitoring the signal indicative of the actual amount of food dispensed by the at least one feeding device from the control input port of the data processing unit, and switching off the feeding device control signal once the monitored amount of food reaches the prescribed amount stored in the RAM means.

8. A stall manager module according to claim 7, wherein:
another one of the stall management procedures consists of transmitting a report signal indicative of the monitored amount of dispensed food via the data output of the data processing unit, while activating the transmitter circuit for transmitting the report signal via the first communication port.

9. A stall manager module according to claim 5, wherein:
one of the stall management procedures consists of producing the feeding device control signal via the control output port of the data processing unit according to the operation data; and
another one of the stall management procedures consists of successively monitoring the signal indicative of the actual amount of food dispensed by the at least one feeding device, and transmitting in real time a status signal indicative of a state of the control input port via the data output of the data processing unit while activating the transmitter circuit for transmitting the status signal via the first communication port.

10. A stall manager module according to claim 5, wherein:
one of the stall management procedures consists of successively deactivating the repeater circuit, detecting an identification request in a command message received by the data input of the data processing unit, transmitting the address code stored in the address memory means via the data output of the data processing unit while activating the transmitter circuit for transmitting the address code via the first communication port, reactivating the repeater circuit, and detecting a global end-of-identification-procedure command in a command message received by the data input of the data processing unit, to resume to normal operation.

11. A stall manager module according to claim 5, wherein:
one of the stall management procedures consists of resetting the stall manager module and returning in normal operation.

12. A stall manager module according to claim 1, further comprising a fixture for mounting the stall manager module onto one of the at least one feeding device.

13. A stall manager module according to claim 1, further comprising a power failure detector connected to the data processing unit.

14. A stall manager system for controlling food distribution and mealtimes in a given number of animal stalls arranged in stall lines, the system comprising:
a given number of electronically controllable feeding devices mounted in each one of the animal stalls, each one of the feeding devices having an inlet for receiving food, an outlet for dispensing the food, and an electric dispensing mechanism for controllably dispensing the food through the outlet in response to a control signal applied to the dispensing mechanism;
a stall manager module for each one of the animal stalls, for controlling the electronically controllable feeding devices mounted therein; and
a central computer unit for management of food distribution and mealtimes relative to each of the feeding devices in each of the animal stalls, the central computer unit having a communication port for addressing selective command messages to the stall manager modules to accomplish the management;
each of the stall manager modules in one of the stall lines comprising:
a first communication port for communication with the central computer unit;
a second communication port for communication with a next one of the stall manager modules in the one of the stall lines and connected in series with the stall manager module;
a repeater circuit connected between the first and second communication ports for relaying data between the central computer unit and the next one of the stall manager modules via the first and second communication ports, said repeater circuit having an enable repeat control input; and
a data processing unit having:
a data input connected to the first communication port for receiving a command message from the central computer unit;
an address memory means for storing a preset unique address code for identifying the stall module manager;
means for detecting an address identifier and an instruction set in the command message received by the data input;
a means for comparing the address identifier with the address code stored in the address memory means and producing an internal recognition signal when the address identifier matches the address code;
a means responsive to the internal recognition signal, for producing feeding device control signals depending on the instruction set;
a control output port for transmitting the control signals to the at least one electronically controllable feeding device; and
a repeater control output connected to the control input of the repeater circuit for controlling the repeater circuit.

15. A stall manager system according to claim 14, further comprising, for each one of the stall lines:
a pair of power supply sources for producing two distinct power supply voltages adapted respectively for the stall manager modules and the electronically controllable feeding devices of the one of the stall lines;
a pair of electric lines for carrying the power supply voltages produced by the power supply sources to the stall manager modules and the electronically controllable feeding devices of the one of the stall lines; and a supply controller interconnected between the power supply sources and the electric lines, the supply controller having first and second interconnected communication ports for communication with the central computer unit and communication with a first one of the stall manager modules in a corresponding one of the stall lines respectively, and controllable switch means to cause application of the power supply voltages on the electric lines.

16. A stall manager system according to claim 14, wherein:

each one of the stall manager modules further comprises:
a receiver circuit having inputs connected to both first and second communication ports, and outputs connected to the repeater and the data input of the data processing unit; and
a transmitter circuit having an input connected to the data output of the data processing unit, an output connected to the first communication port, and an enable send control input;

and the data processing unit of each one of the stall manager modules further has:
a data output connected to the first communication port for transmitting operation report data to the central computer unit;
a control input port for receiving a signal indicative of an actual amount of food dispensed by the at least one feeding device;
a transmitter control output connected to the control input of the transmitter circuit for controlling the transmitter circuit; and
RAM means for storage of temporary or programmable data, ROM means for storage of stall management procedures that are selectively activated depending on the instruction set, means responsive to the internal recognition signal for detecting a command and optional operation data in the instruction set, and means for executing one of the stall management procedures stored in the ROM means depending on the command.

17. A stall manager system according to claim 16, wherein:

the central computer unit further has:
database means containing information relative to feeding processes for each animal in the stalls in correlation with the stall manager modules and the feeding devices of the stall manager system;
means for managing the database means in response to user or device requests;
schedule means for scheduling mealtimes; and
means for issuing the command messages to the stall manager modules for controlling the food distribution in the animal stalls during the mealtimes according to the information contained in the database means, and for collecting the monitored amounts of dispensed food from the stall manager modules after the mealtimes.

18. A stall manager system according to claim 17, wherein:

the central computer unit further has:
a means for monitoring and controlling a number of the stall manager modules simultaneously in activity.

* * * * *